United States Patent [19]
Watson

[11] Patent Number: 5,348,433
[45] Date of Patent: Sep. 20, 1994

[54] QUICK-RELEASE CARGO NET SECURING DEVICE

[75] Inventor: Peter Watson, Vancouver, Canada

[73] Assignee: Skytainer Services, Inc., Vancouver, Canada

[21] Appl. No.: 857,375

[22] Filed: Mar. 25, 1992

[51] Int. Cl.$^5$ .................. F16B 21/00; B61D 45/00
[52] U.S. Cl. .................... 411/347; 24/663; 292/359; 410/118; 411/529
[58] Field of Search ............ 411/199, 553, 200, 329, 411/347, 348, 350, 351, 352, 395, 918, 925, 529; 403/326, 194; 292/59, 359; 24/676, 453, 663, 597; 160/370.1, 332; 296/50; 410/117, 118, 97

[56] References Cited

U.S. PATENT DOCUMENTS

| | | | |
|---|---|---|---|
| 1,055,294 | 3/1913 | Stevenson | 411/395 |
| 2,455,237 | 11/1948 | Davis | 410/97 |
| 2,552,066 | 5/1951 | Sorensen | 411/349 |
| 2,948,317 | 8/1960 | Munro | 411/352 |
| 3,080,633 | 3/1963 | Reddy | 24/597 X |
| 3,471,186 | 10/1969 | Luebbert et al. | 403/326 X |
| 3,736,834 | 6/1973 | MacDonald | 411/351 |
| 4,218,979 | 8/1980 | Esposito et al. | 403/326 X |
| 4,295,765 | 10/1981 | Burke | 411/395 X |
| 4,580,322 | 4/1986 | Wright et al. | 24/663 X |
| 4,739,528 | 4/1988 | Allen | 410/118 X |
| 5,026,231 | 6/1991 | Moore | 410/118 |
| 5,096,236 | 3/1992 | Thony | 24/597 X |
| 5,121,958 | 6/1992 | Goeden et al. | 410/117 |
| 5,149,164 | 9/1992 | Wilson | 296/50 |

FOREIGN PATENT DOCUMENTS 514227 11/1939 United Kingdom .............. 24/453

*Primary Examiner*—Rodney M. Lindsey
*Attorney, Agent, or Firm*—Cahill, Sutton & Thomas

[57] ABSTRACT

A fastener which including a probe having a shaft portion and a head to which is attachable a flexible strap, a receptacle affixable to a panel having a hole therethrough, and a spring for locking the probe in place when the probe is inserted into the hole. Upon insertion of the probe into or rotation of the probe in the hole of receptacle, the spring permits further insertion or withdrawal of the probe.

13 Claims, 1 Drawing Sheet

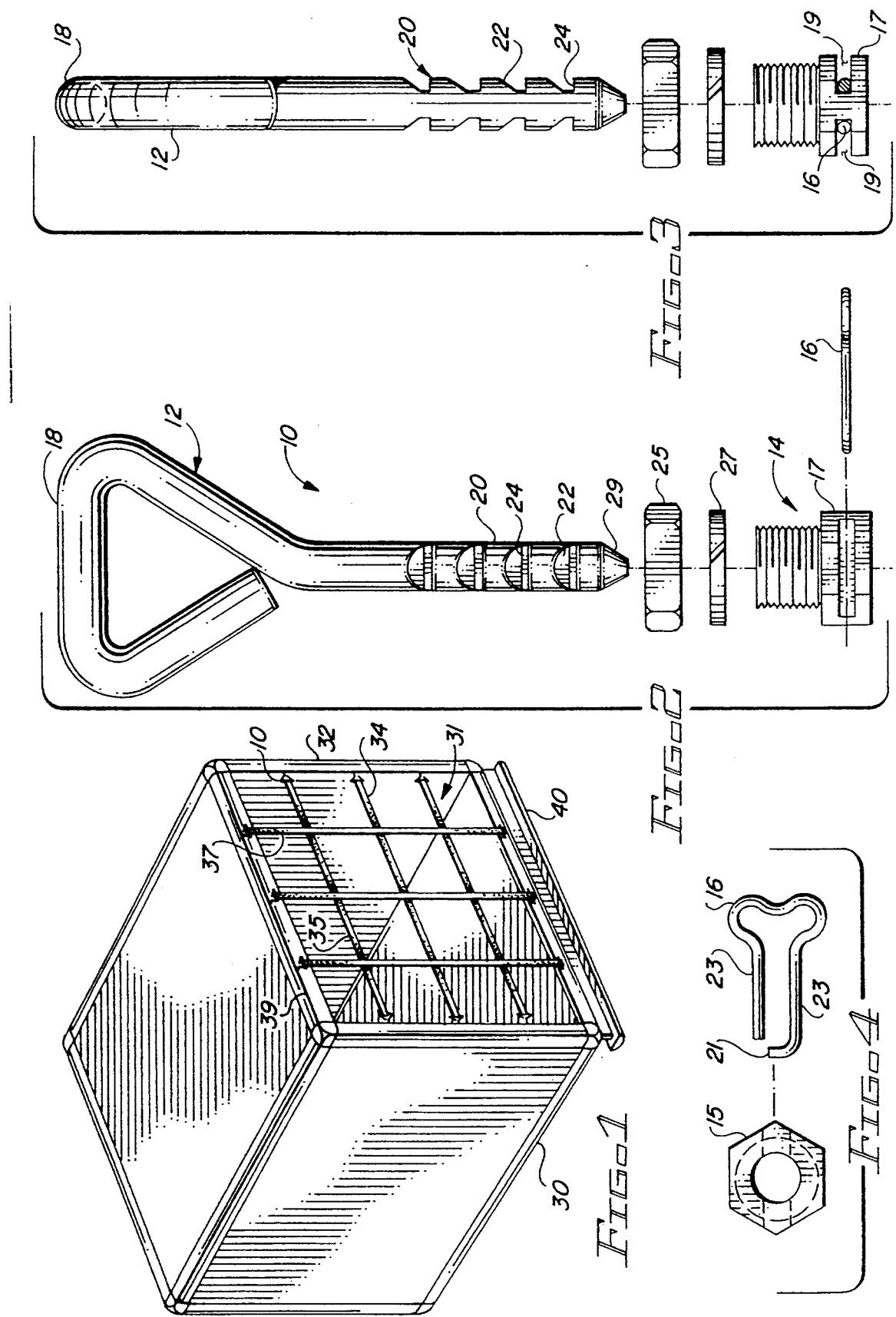

QUICK-RELEASE CARGO NET SECURING DEVICE

FIELD

The present invention relates to a quick-release device which secures and permits tensioning of cargo nets used with air cargo containers.

BACKGROUND

The door opening of certain air cargo containers is closed by the use of a roof-mounted hanging fabric curtain. This fabric provides security, prevents small articles from falling out of the container, and prevents the ingress of rain water. To provide structural support to the fabric curtain, netting is generally stretched across the door opening outside the fabric curtain. Various types of hook, latch or clip systems have been used for attaching the netting across the front of air cargo containers, and different forms of buckles or cam-buckle combinations have been used to tension the net elements. Some systems combine the attachment and tensioning devices. The fasteners for such netting must be capable of withstanding of the order of 2,000 pounds tension and be able to be released easily with one hand when under tension. Most such devices involve separate securing and tensioning steps.

Many prior devices have protrusions which are susceptible to snagging on people or equipment coming into close proximity to the fasteners. Other devices have components which include coil springs which are prone to failure and cannot support large loads given the size limitations on such springs. Yet other devices require drilling a plurality of mounting holes in the container thereby weakening its integrity as well as requiring several manufacturing steps.

Accordingly, there is a need for a fastener for cargo container netting which releases easily even when under tension and which is small, unobtrusive, inexpensive, simple to construct and operate and which can withstand loads of up to about 2000 pounds.

An object of the present invention is to provide an improved method of attaching and tensioning netting fronts for air cargo containers. It is a further objective to provide a highly durable device capable of carrying severe tension loads but which can be quickly released even when under load. It is yet a further objective to provide a device which, either when connected or disconnected, has no components capable of snagging or hooking on people or equipment which may be moving in close proximity. Yet another objective is to provide a design which requires only a single mounting hole on the container for each device.

SUMMARY OF THE INVENTION

According to the invention there is provided a fastener including a probe having a shaft portion and a head to which is attachable a flexible strap.

The probe shaft portion has a plurality of notches spaced apart along its length on either side thereof. Each notch has a flat shoulder face perpendicular to an axis of the shaft portion and nearest an anterior end of the probe shaft portion. An inclined shoulder is inclined outwardly and rearwardly of the anterior end of the shaft portion. A bolt having a hole therethrough and slots formed on either side transverse to the bolt axis intersects the hole. The spring has parallel arms which pass through the slots and intersect and partially obstruct the hole. A spring is adapted to be coupled to the bolt and is biased so as to intersect the hole and lock the probe in place when the probe is inserted into the hole. Upon inserting the probe or twisting it, the spring is opened thereby permitting further insertion or withdrawal of the probe.

Nets which form part of the door structure of the container stretch across the door opening so that they lie in the plane defined by the perimeter of the door opening. In such cases, only a narrow range of length adjustment and modest degrees of tension are required to achieve the objective of containment of the load. The separation between pairs of notches on the shaft portion determine the tensioning achievable in the present case. There is no requirement for increasing the tension on a strap in the present invention in order to relax the tension thereon. Moreover, the fastener only requires one bolt hole for installation.

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

FIG. 1 is a front elevation view of a cargo container door opening;

FIG. 2 is an exploded front elevation view of the fastener device;

FIG. 3 is a side elevation view of the device shown in FIG. 2; and

FIG. 4 is bottom view of the receptacle.

DETAILED DESCRIPTION WITH REFERENCE TO THE DRAWINGS

Referring to FIG. 1, a fastener 10 is shown attached to each end of a strap 34 and affixed around a door frame 32 of a cargo container 30. The fasteners 10 are designed to keep the straps 34 taut to provide support to a simple, non-structural fabric curtain hanging between the contents of the container and the net. The netting straps and the curtain together prevent the goods inside the container from falling out when it is moved or jarred.

Referring to FIGS. 2, 3 and 4 there is shown in detail the fastener 10 which consists of a probe 12 having a looped head 18 around which is tied a strap 34 (see FIG. 1). Opposite the triangular loop forming head 18 having one side perpendicular to shaft 20, there is a notched shaft 20 having a plurality of notches 22 with each notch 22 having a flat shoulder 24 facing the head end 18.

A receptacle 14 designed to receive and capture the probe 12 is a short metal bolt having a hexagon shaped head 17, a central hole 15 therethrough, and two opposed parallel slots 19 across two parallel sides of the hexagon head 17, perpendicular to the axis of the bolt. The separation distance between the two slots is less than the diameter of the hole through the bolt and, therefore, the slots 19 pass through and communicate with central hole 15.

A spring 16 with a modified "U" shape, and having its end 21 crossed to close the open end, is fitted into the slots 19 so that the two parallel leg portions 23 of the "U" intersect the central hole 15.

The receptacle 14 is mounted in the door frame 32 with a securing nut 25 and lock washer 27 so that the spring 16 is aligned parallel with the container door frame 32 in which it is mounted.

The probe 12 is comprised of a formed round metal bar bent in the shape shown in FIGS. 2 and 3. At the end of the shaft or insertable end 20 of the probe 12 there is a bevel 29 with a narrow diameter smaller than the distance separating the leg portions 23 of the spring 16. In the shaft 20 of the probe 12 there are a series of paired notches or grooves 22, one on each side of the portion 20. The grooves are shaped with one side 24 perpendicular to the shaft 20 and the other side of each groove 22 at an acute angle to the shaft 20. The straps 34 of the net are attached to the probe by looping the strap 34 through the aperture of the probe and sewing it back on itself.

To operate the device, the probe 12 to which the straps 34 are attached is pushed into the receptacle 14 with the plane of the probe 12 parallel with the door frame 32. The bevelled end 29 of the probe 12 goes between the arms 23 of the spring 16, forcing the spring open, allowing the probe to enter. As the probe is pushed further in the front pair of grooves become aligned with the spring 16. The spring 16 then closes into the grooves 22 so that the perpendicular face 24 of the grooves 22 prevents retraction of the probe 12. However, the bevelled side of the grooves permits the probe 12 to be pushed further in, forcing the spring 16 to open again. When the next pair of grooves 22 is reached the same effect is repeated. As the probe 12 reaches each pair of grooves 22 a ratcheting action occurs, taking up the slack in the cargo net.

To release the probe 12, it is turned through a quarter-turn. The spring arms 23 are forced apart, thereby releasing the spring 16 from the engagement grooves 22. The probe 12 may now be withdrawn from the receptacle 14. The corresponding strap 34 is thus released. Repeating this procedure until fasteners for two adjacent sides and bottom of the door frame 32 are released then permits entry to the air cargo container 30.

Air cargo container door way straps 34 are in a matrix of horizontal and vertical straps 35 and 37, respectively. The vertical members 37 are permanently attached at a roof 39 of the container 30 and removably attached to the base 40; the horizontal straps 35 are removably attached at each side of door frame 32. The receptacles 14 are mounted around the door frame 32 where the horizontal and vertical strap members 35 and 37, respectively, must be attached to the container 30. The probes 12 are attached to the strap ends and mate with the receptacles 14.

The tensioning effect achieved by using the series of paired grooves 22 as a ratchet is advantageous only at one end of each strap 34. In the case of the horizontal strap 35, therefore, where probes 12 are present at both ends of a strap 34 to connect with their corresponding receptacles 14, one of the probes 12 is modified to provide only a securing function. The shaft 20 of the probe 12 is press-formed so that only the groove pair 22 at the end of the probe 12 can engage the receptacle spring 16. Alternatively, a modified probe 12 with only one pair of grooves 22, which is located close to the bevelled end 29 of the probe 12, is used.

Accordingly, while this invention has been described with reference to illustrative embodiments, this description is not intended to be construed in a limiting sense.

Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A fastener, comprising:
   (a) a probe having a shaft portion and a head to which is attachable a flexible strap, said shaft portion having a pair of notches on either side thereof, each notch having a flat shoulder face perpendicular to an axis of the shaft portion and being nearest an anterior end of said shaft portion and a shoulder inclined outwardly and rearwardly of said anterior end;
   (b) a bolt affixable to a panel, said bolt having a hole therethrough and having slots formed on either side of said bolt intersecting the hole; and
   (c) a spring couplable to said bolt and having parallel arms which pass through the slots so as to intersect the hole and lock said probe in place when said probe is inserted into the hole;
   whereby upon insertion of said probe into or twisting of said probe in the hole of said bolt, said spring is opened thereby permitting further insertion or withdrawal of said probe.

2. A fastener according to claim 1, wherein said bolt has a threaded portion and a head portion, the slots being formed in the head portion.

3. A fastener according to claim 2, including a threaded nut having threads which register with the threaded portion of said receptacle.

4. A fastener according to claim 1, including a plurality of spaced apart pairs of notches, wherein each of said notches has a shoulder inclined outwardly and rearwardly of said anterior end, pairs of notches being parallel and spaced an equal distance from the anterior end of said shaft portion.

5. A fastener according to claim 1, wherein at least one of said spring parallel arms is bent towards the other at a distal end thereof.

6. A fastener according to claim 1, wherein the head of said probe is generally triangular with a triangular aperture and one side of the triangular head perpendicular to said shaft portion.

7. A fastener for a strap, comprising:
   (a) a probe having a shaft portion and a head end to which there is attachable a flexible strap, said shaft portion having a plurality of spaced apart notches formed along opposite sides theroef and a tapered end;
   (b) a bolt having a head and a threaded end which is insertable through a panel, said bolt having a hole therethrough through which said shaft portion is slidable and a pair of slots formed in the head of said bolt on opposite sides thereof and intersecting the hole in said bolt; and
   (c) a spring having parallel arms insertable through said slots so as to engage the notches in said shaft portion when positioned at said slots thereby blocking withdrawal of said shaft portion from said bolt and resisting further insertion of said shaft portion through the hole;
   whereby upon rotation of said probe in the hole from a position in which the arms of said spring engage the sides of a pair of said notches, said spring is opened thereby permitting further insertion or withdrawal of said probe.

8. A fastener according to claim 7, wherein one of the ends of said spring arms is bent towards the other to prevent removal of said spring from the slots.

9. A fastener according to claim 7, including a nut registering with threads of said bolt.

10. A fastener according to claim 7, wherein said notches each have a shoulder face nearest an anterior end of said shaft portion which shoulder is perpendicular to an axis of said shaft portion and a face furthest from the anterior end which diverges outwardly from said shoulder face and wherein the thickness of said shaft portion between said notches is equal to or less than that between parallel arms of said spring.

11. A net for blocking the opening of a cargo container, said net comprising a plurality of spaced apart, substantially orthogonal, flexible straps extendible across said opening, and a plurality of fasteners attached one each to at least one end of at lest some of said straps, wherein each fastener includes:

(a) a probe having a shaft portion and a head attached to one of said flexible straps, said shaft portion having a pair of opposed notches with a shoulder face nearest to an anterior end of said shaft portion;

(b) a bolt having a hole therethrough and having slots formed on either side of said bolt intersecting said hole, said bolt affixable to said container; and (c) spring means having two parallel arms which engage said slots for locking said probe in place when said probe is inserted into the hole;

whereby upon insertion of said probe into or rotation of said probe in the hole of said receptacle, said spring means permits further insertion or withdrawal of said probe.

12. A net according to claim 11, wherein said shaft portion has a plurality of pairs of opposed notches with a shoulder face nearest to the anterior end of said shaft portion and said spring means is a spring having two parallel arms which engage sides of said notches when said notches are aligned with said slots.

13. A net according to claim 12, wherein said bolt has a threaded end and a bolt head with said slots, said slots being opposed parallel slots which intercept the hole such that the width between said slots is narrower than the diameter of the hole but equal to or larger than the narrowest region across the opposed notches.

* * * * *